United States Patent
Nakamura et al.

(10) Patent No.: US 8,904,492 B2
(45) Date of Patent: Dec. 2, 2014

(54) METHOD OF CONTROLLING INFORMATION PROCESSING SYSTEM, COMPUTER-READABLE RECORDING MEDIUM STORING PROGRAM FOR CONTROLLING APPARATUS

(75) Inventors: Yosuke Nakamura, Kawasaki (JP); Kazuaki Nimura, Kawasaki (JP); Hidenobu Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 120 days.

(21) Appl. No.: 13/566,300

(22) Filed: Aug. 3, 2012

(65) Prior Publication Data

US 2013/0074160 A1 Mar. 21, 2013

(30) Foreign Application Priority Data

Sep. 15, 2011 (JP) .................................. 2011-202439

(51) Int. Cl.
*H04L 29/06* (2006.01)
*G06F 21/54* (2013.01)
*G06F 21/12* (2013.01)

(52) U.S. Cl.
CPC ............... *G06F 21/54* (2013.01); *G06F 21/125* (2013.01); *H04L 63/12* (2013.01); *H04L 63/10* (2013.01); *G06F 2221/2141* (2013.01)
USPC ............................................................ 726/4

(58) Field of Classification Search
CPC ....... G06F 21/54; G06F 21/125; H04L 63/10; H04L 63/12
USPC .......................................................... 726/4
See application file for complete search history.

(56) References Cited

U.S. PATENT DOCUMENTS 7,047,562 B2 * 5/2006 Peterson et al. ................. 726/14
7,363,275 B2 * 4/2008 Kojima et al. .................. 705/54
7,503,067 B2 * 3/2009 Yeung et al. .................... 726/17
7,509,497 B2 * 3/2009 Joy et al. ........................ 713/172
7,636,937 B1 * 12/2009 Bhattacharya et al. ........... 726/2
7,647,630 B2 * 1/2010 Arroyo et al. ................... 726/21
8,572,368 B1 * 10/2013 Deacon ......................... 713/158
8,646,100 B2 * 2/2014 Swingler et al. ................ 726/27
2002/0099952 A1 7/2002 Lambert et al.
2009/0222925 A1 9/2009 Hilaiel et al.
2009/0249075 A1 * 10/2009 De Atley et al. .............. 713/176

FOREIGN PATENT DOCUMENTS

| JP | 2003-507785 | 2/2003 |
| WO | WO 01/13199 | 2/2001 |
| WO | WO 2009/111411 A2 | 9/2009 |

OTHER PUBLICATIONS

Extended European Search Report issued Jun. 24, 2013 in corresponding European Application No. 12176979.8.

* cited by examiner

*Primary Examiner* — Michael S McNally
(74) *Attorney, Agent, or Firm* — Staas & Halsey LLP

(57) ABSTRACT

A method includes generating, by a relay apparatus, association information on the basis of access information such that a plurality of pieces of code included in a received application program are associated with information on permission for executing the plurality of pieces of code, and sending the received application program and the generated association information to a client apparatus configured to execute the received application program, receiving the received application program and the association information from the relay apparatus, and executing, by a client apparatus, a piece of code that is permitted to be executed and not executing a piece of code that is not permitted to be executed with reference to the association information when the client apparatus executes the plurality of pieces of code included in the received application program.

4 Claims, 11 Drawing Sheets

| OBJECT | METHOD | EXTRACTION PARAMETER | ACL DESCRIPTION RULE |
|---|---|---|---|
| camera | captureImage | NONE | <feature name = "http://wacapps.net/api/camera"/> |
| XMLhttpRequest | open | SECOND ARGUMENT | <access origin = "open second argument of open" |

- EXTRACT FOLLOWING FROM SOURCE CODE OF APPLICATION (HTML, JavaScript)
- DEVICE ACCESS (CAMERA)
— CAMERA OBJECT OF WAC, captureImage var mainCamera;

...

var camopts = {destinationFilename:"images/a.jpg",highres:true};
  var op;

...

op = mainCamera.captureImage(onCaptureImageSuccess, onCaptureImageError, camopts)

- ACCESS TO EXTERNAL SITE
— SECOND ARGUMENT OF JavaScript XML HttpRequest var hReq = new XMLHttpRequest();
  hReq.open("GET",http://hogehoge.com,TRUE);

— ANCHOR TAG OF HTML: <a href="URL">
— `location.href="URL"´ IN JavaScript

FIG. 8

· EXAMPLE OF ACL IN CONFORMITY WITH WAC

```
<?xml version="1.0" encoding="UTF-8"?>
<widget  xmlns="http://www.w3.org/ns/widgets"  xmlns:wac="http://wacapps.net/ns/widgets"
id="http://example.org/helloworld"  version="1.0 Beta"  height="200"  width="300"
viewmodes="floating"  wac:min-version="2.0">
   <icon src="icon.png"/>
   <content src="helloworld.html" encoding="UTF-8"/>
   <access origin="http://www.aaabbb.com/*"/>            ⇒ PERMITTED URL
   <access origin="http://www.aaabbb.co.jp/*"/>
   <feature name="http://wacapps.net/api/camera"/>       ⇒ PERMIT CAMERA DEVICE
   <name short="HelloWorld">Hello World</name>
   <description>Hello World Widget.</description>
   <license  href="http://license.example.org/">Example license Copyright (c) 2011.</license>
   <author  email="myname@host"   href="http://foo-bar.example.org/">myname</author>
</widget>
```

METHOD OF CONTROLLING INFORMATION PROCESSING SYSTEM, COMPUTER-READABLE RECORDING MEDIUM STORING PROGRAM FOR CONTROLLING APPARATUS

CROSS-REFERENCE TO RELATED APPLICATION

This application is based upon and claims the benefit of priority of the prior Japanese Patent Application No. 2011-202439, filed on Sep. 15, 2011, the entire contents of which are incorporated herein by reference.

FIELD

The embodiment discussed herein is related to a method of controlling an information processing system, a storage medium storing a program for controlling a relay apparatus, and a storage medium storing a program for controlling a client apparatus.

BACKGROUND

Smartphones are mobile terminals having personal-computer-like capabilities and are becoming widespread. The environment in which smartphones can be coupled to networks all the time is established owing to the expansion of hot spots, for example. Applications that can be executed by smartphones exist in three types, native applications, Web applications, and hybrid mobile applications.

Native applications are of a general form and are application programs created specifically for terminals that execute the application programs. Native applications can basically do whatever they want because they can freely handle local resources and devices of the terminals. Unfortunately, native applications created specifically for terminals involve installation, and therefore developers have to create applications customized for every operating system (OS). Web applications are executed on browsers, and therefore they do not have to be installed in terminals and can be executed independent of the OSs. Unfortunately, Web applications basically work on Web servers, but not on terminals, and therefore their local-resource operations are limited to some operations such as file operation using File API of JavaScript. The operations of Web applications are confined within narrower limits than those of the native applications. Hybrid mobile applications can be created in a development environment, such as PhoneGap or wholesale applications community (WAC). Hybrid mobile applications can be executed independent of the OSs of terminals, like Web applications, and can freely access local resources and devices, like native applications.

Security issues may arise when these applications are executed. One of the main factors is malware, which is spreading among smartphones, and the number of applications including malware is increasing. There are an increasing number of cases where a user installs an application including malware in a smartphone and executes the application. To avoid execution of malware, a user may simply check for a warning regarding access permission that is displayed at the time of installation of an application, and not install the application if access permission unnecessary for originally intended functions of the application is included. This, however, depends on the skill of a user. It is therefore difficult for all users to avoid execution of malware.

Japanese National Publication of International Patent Application No. 2003-507785 is an example of the related art.

SUMMARY

According to an aspect of the embodiment, a method includes generating, by a relay apparatus, association information on the basis of access information such that a plurality of pieces of code included in a received application program are associated with information on permission for executing the plurality of pieces of code, and sending the received application program and the generated association information to a client apparatus configured to execute the received application program, receiving the received application program and the association information from the relay apparatus, and executing, by a client apparatus, a piece of code that is permitted to be executed and not executing a piece of code that is not permitted to be executed with reference to the association information when the client apparatus executes the plurality of pieces of code included in the received application program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 depicts an analysis rule;

FIG. 7 depicts a code extraction process;

FIG. 8 depicts an application control list (ACL);

DESCRIPTION OF EMBODIMENT

An information processing system in this embodiment will be described hereinafter.

Figure 1:
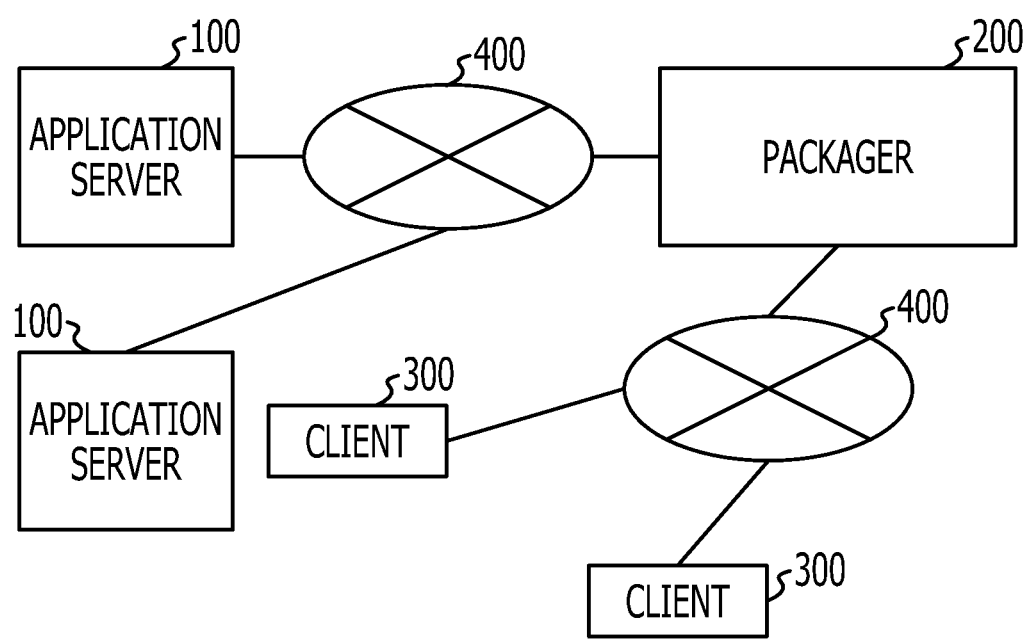
FIG. 1 depicts an information processing system.

FIG. 1 depicts an information processing system in this embodiment. The information processing system includes a plurality of application servers 100, networks 400, a packager 200, and a plurality of clients 300. The plurality of application servers 100, the packager 200, and the plurality of clients 300 are mutually coupled through the networks 400.

The application server 100 publishes a Web application. The packager 200, which is a relay apparatus, analyzes a Web application, generates an application control list (ACL), and publishes the generated ACL and the Web application in such a manner that the ACL is associated with the Web application. A description of the ACL will be given below. The client 300 executes an application. Note that a configuration composed of the application server 100, the packager 200, and the client 300 may be adopted as the minimum configuration of the information processing system.

Figure 2:
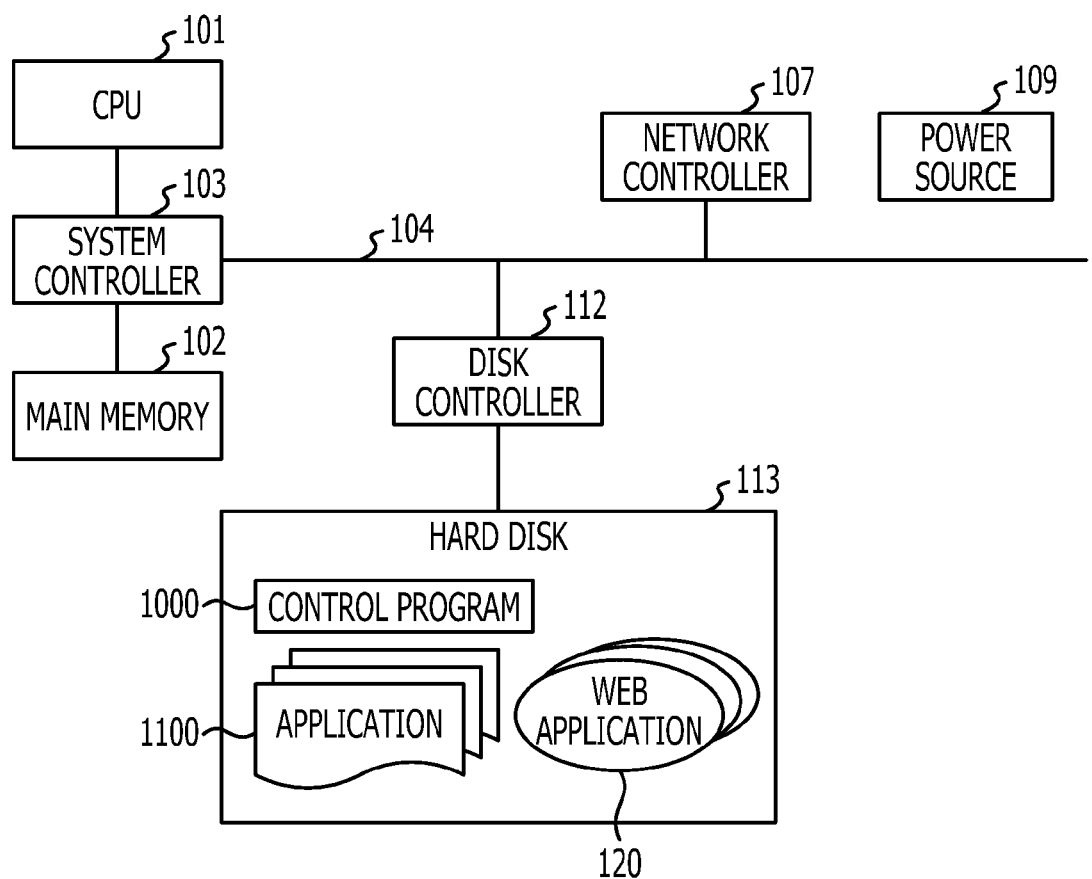
FIG. 2 is a block diagram depicting a configuration of an application server.

With reference to FIG. 2, the application server 100 in this embodiment will be described. The application server 100 includes a central processing unit (CPU) 101, a main memory 102, a system controller 103, a bus 104, a network controller 107, a power source 109, a disk controller 112, and a hard disk 113. The application server 100 is controlled by the CPU 101.

The system controller 103 is coupled to the CPU 101 and the main memory 102. The system controller 103 controls data transfer between the CPU 101 and the main memory 102 and data transfer between the CPU 101 and the bus 104. The network controller 107 and the disk controller 112 are coupled via the bus 104 to the system controller 103.

At least some OS programs and application programs that are to be executed by the CPU 101 are temporarily stored in the main memory 102. Various data that is used for processing performed by the CPU 101 is stored in the main memory 102. A random access memory (RAM), for example, is used as the main memory 102.

The hard disk 113 is coupled to the disk controller 112. The disk controller 112 controls the hard disk 113. The hard disk 113 stores applications 1100 that the CPU 101 executes in the main memory 102, a control program 1000 for causing the CPU 101 to perform control such as invoking the application 1100 in question, Web applications 120 to be published, and various data.

The network controller 107 is coupled to the packager 200 via the network 400 depicted in FIG. 1, and sends and receives the Web applications 120 and various data to and from the packager 200.

The power source 109 supplies electric power to each piece of hardware in the application server 100 via power source wires (not depicted).

Hardware as described above implements processing functions of the application server 100.

Figure 3:
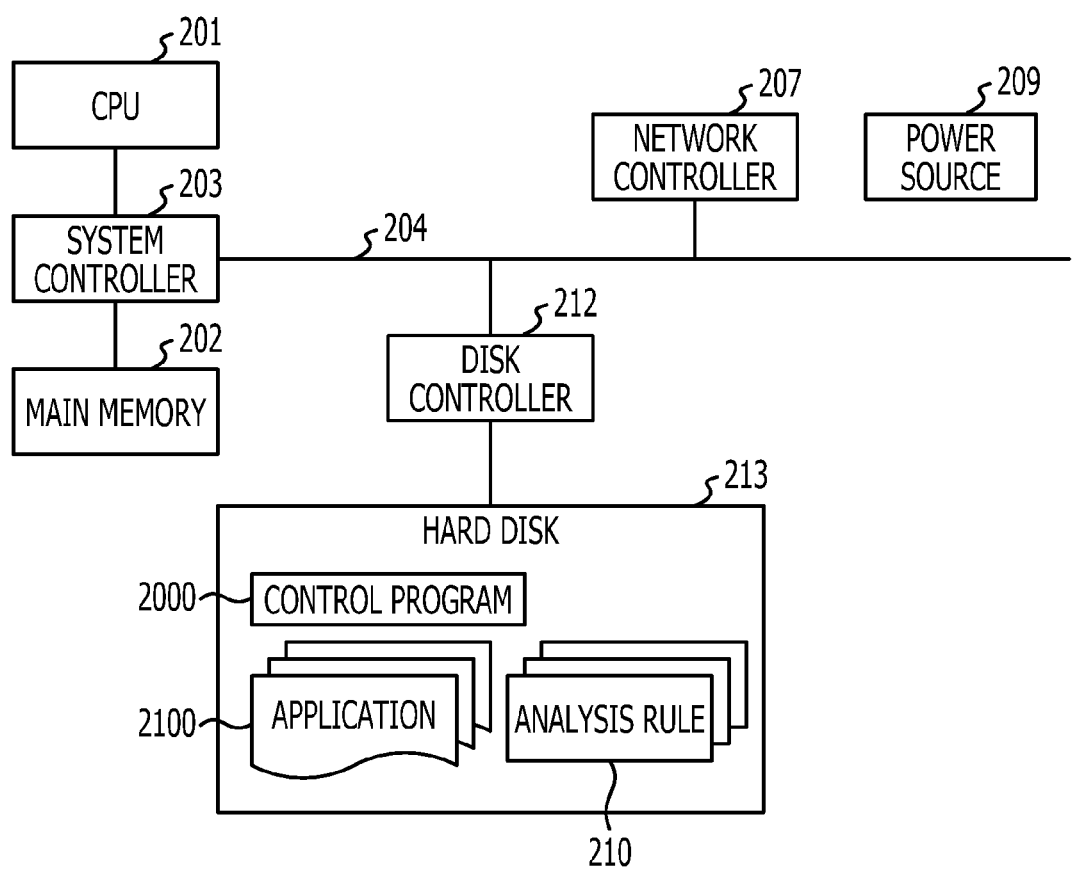
FIG. 3 is a block diagram depicting a configuration of a packager.

With reference to FIG. 3, the packager 200 in this embodiment will be described. The packager 200 includes a CPU 201, a main memory 202, a system controller 203, a bus 204, a network controller 207, a power source 209, a disk controller 212, and a hard disk 213. The packager 200 is controlled by the CPU 201.

The system controller 203 is coupled to the CPU 201 and the main memory 202. The system controller 203 controls data transfer between the CPU 201 and the main memory 202 and data transfer between the CPU 201 and the bus 204. The network controller 207 and the disk controller 212 are coupled via the bus 204 to the system controller 203.

At least some OS programs and application programs that are to be executed by the CPU 201 are temporarily stored in the main memory 202. Various data that is used for processing performed by the CPU 201 is stored in the main memory 202. A RAM, for example, is used as the main memory 202.

The hard disk 213 is coupled to the disk controller 212. The disk controller 212 controls the hard disk 213. The hard disk 213 stores applications 2100 that the CPU 201 executes in the main memory 202, a control program 2000 for causing the CPU 201 to perform control such as invoking the application 2100 in question, analysis rules 210, an ACL 230, and various data.

The network controller 207 is coupled via the networks 400 depicted in FIG. 1 to the application servers 100 and the clients 300, and sends and receives data to and from the application servers 100 and the clients 300.

The power source 209 supplies electric power to each piece of hardware in the packager 200 via power source wires (not depicted).

Hardware as described above implements processing functions of the packager 200.

Figure 4:
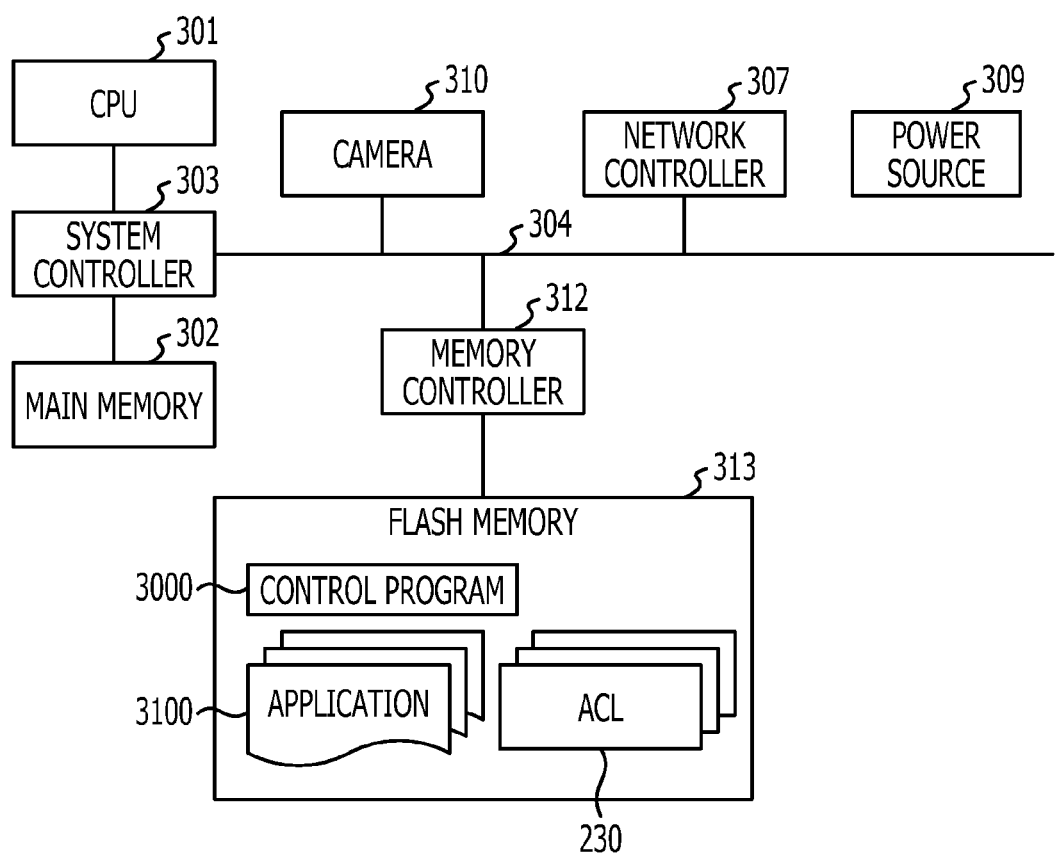
FIG. 4 is a block diagram depicting a configuration of a client.

With reference to FIG. 4, the client 300 in this embodiment will be described. The client 300 includes a CPU 301, a main memory 302, a system controller 303, a bus 304, a network controller 307, a power source 309, a camera 310, a memory controller 312, and a flash memory 313. The client 300 is controlled by the CPU 301.

The system controller 303 is coupled to the CPU 301 and the main memory 302. The system controller 303 controls data transfer between the CPU 301 and the main memory 302 and data transfer between the CPU 301 and the bus 304. The network controller 307 and the memory controller 312 are coupled via the bus 304 to the system controller 303.

At least some OS programs and application programs that are to be executed by the CPU 301 are temporarily stored in the main memory 302. Various data that is used for processing performed by the CPU 301 is stored in the main memory 302. A RAM, for example, is used as the main memory 302.

The flash memory 313 is coupled to the memory controller 312. The memory controller 312 controls the flash memory 313. The flash memory 313 stores application programs 3100 that the CPU 301 executes in the main memory 302, a control program 3000 for causing the CPU 301 to perform control such as invoking the application 3100 in question, and various data. The flash memory 313 stores the Web applications 120 and ACLs 230 received from the packager 200 and an engine for building an application execution environment.

The network controller 307 is coupled via the network 400 depicted in FIG. 1 to the packager 200, and sends and receives data to and from the packager 200.

The camera 310 captures an image and stores the captured image in the flash memory 313.

The power source 309 supplies electric power to each piece of hardware in the client 300 via power source wires (not depicted).

Hardware as described above implements processing functions of the client 300.

Figure 5:
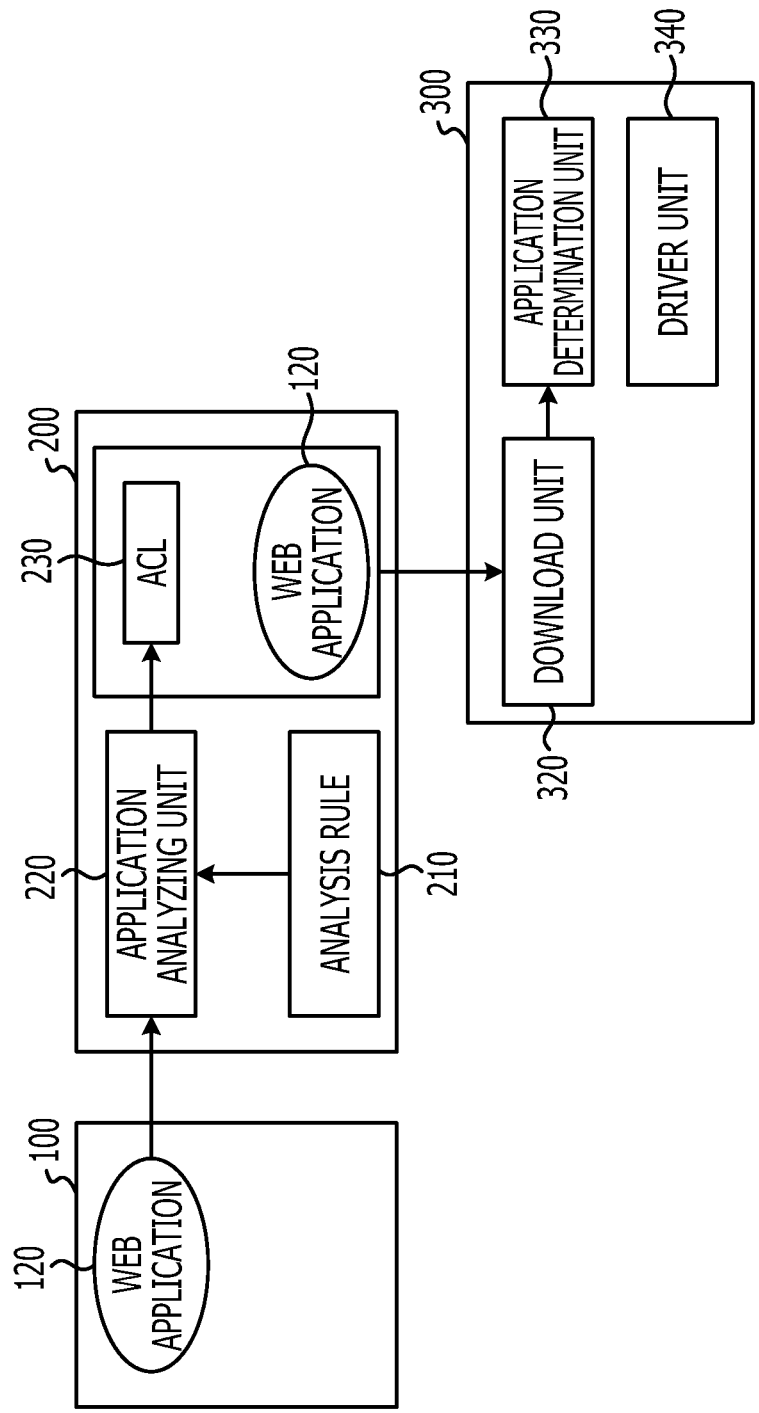
FIG. 5 depicts details of the information processing system.

FIG. 5 depicts the information processing system in this embodiment. Functions of blocks depicted in FIG. 5 are implemented by execution of the application 2100 by the CPU 201 of the packager 200 and execution of the application 3100 by the CPU 301 of the client 300.

The packager 200 has an application analyzing unit 220, the analysis rule 210, and the ACL 230. The application analyzing unit 220 analyzes the Web application 120 received from the application server 100, on the basis of the analysis rule 210, and generates the ACL 230. The analysis rule 210 is a rule that describes device access and site access to be extracted from the Web application 120 and entered in the ACL 230. The ACL 230 is a list that describes devices and sites to which access is permitted. A downloading unit 320 receives the Web application 120 and the ACL 230 from the packager 200. An application determination unit 330 enforces an access restriction when access to a device or a site is performed by using the Web application 120 received by the downloading unit 320 with reference to the ACL 230 received by the downloading unit 320. A driver unit 340 controls an interface of the client 300. Note that the packager 200 may apply an encryption key or the like to the ACL 230 in order to detect alteration of the ACL 230.

FIG. 6 depicts an example of the analysis rule 210. The analysis rule 210 has items of an object 2101, a method 2102, an extraction parameter 2103, and an ACL description rule 2104. The object 2101 represents a device or an external site on which imposition of an access restriction is desired. The method 2102 represents an operation. The extraction parameter 2103 represents information extracted from a function name. The ACL description rule 2104 represents information to be added to the ACL 230.

With reference to FIG. 7, processing in which the application analyzing unit 220 extracts pieces of code will be described. The application analyzing unit 220 extracts particular pieces of code from source code of an application written in HyperText Markup Language (HTML) and JavaScript. The application analyzing unit 220 extracts "camera object of web authoring control (WAC), captureImage" as device access. In this embodiment, the application analyzing unit 220 extracts "mainCamera.captureImage (onCaptureImageSuccess, onCaptureImageError, camopts)" from the source code of the application. The application analyzing unit 220 extracts the second argument of JavaScript XMLHttpRequest as access to an external site. In this embodiment, the application analyzing unit 220 extracts "http://hogehoge.com" from the source code of the application.

FIG. 8 depicts an example of the ACL 230. On the basis of the analysis rule 210, the application analyzing unit 220 describes permitted URLs in portions of <access origin="http://www.aaabbb.com/*"/> <access origin="http://www.aaabbb.co.jp/*"/> depicted in FIG. 8. On the basis of the analysis rule 210, the application analyzing unit 220 describes a permitted device name in a portion of <feature name="http://wacapps.net/api/camera"> depicted in FIG. 8.

Figure 9:
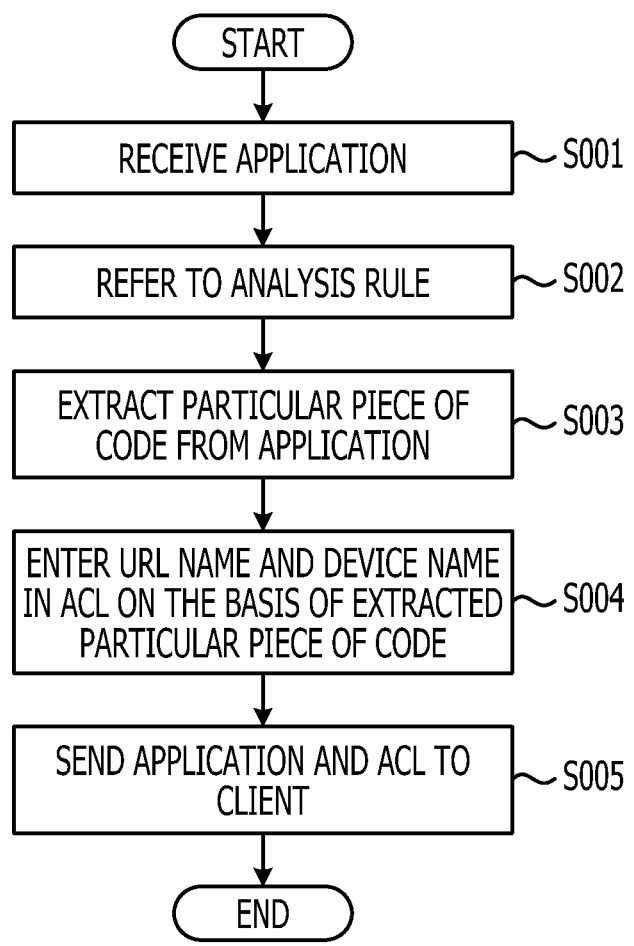
FIG. 9 is a flowchart depicting processing of the packager.

FIG. 9 depicts processing of the packager 200.

In step S001, the application analyzing unit 220 receives the application 120 from the application server 100. The application analyzing unit 220 advances the process to step S002.

In step S002, the application analyzing unit 220 refers to the analysis rule 210. The application analyzing unit 220 advances the process to step S003.

In step S003, the application analyzing unit 220 extracts a particular piece of code from the application 120 on the basis of the analysis rule 210. For example, the application analyzing unit 220 extracts a particular piece of code from the source code described with reference to FIG. 7. The application analyzing unit 220 advances the process to step S004.

In step S004, on the basis of the extracted particular piece of code, the application analyzing unit 220 enters, in the ACL 230, the names of a URL and a device to which access is permitted. For example, the application analyzing unit 220 enters the names of the permitted URL and device in the ACL 230 described above with reference to FIG. 8. The application analyzing unit 220 advances the process to step S005.

In step S005, the application analyzing unit 220 sends the application 120 and the ACL 230 to the client 300. The names of the URL and the device to which access is permitted are entered in the ACL 230. The application analyzing unit 220 completes the process.

Figure 10:
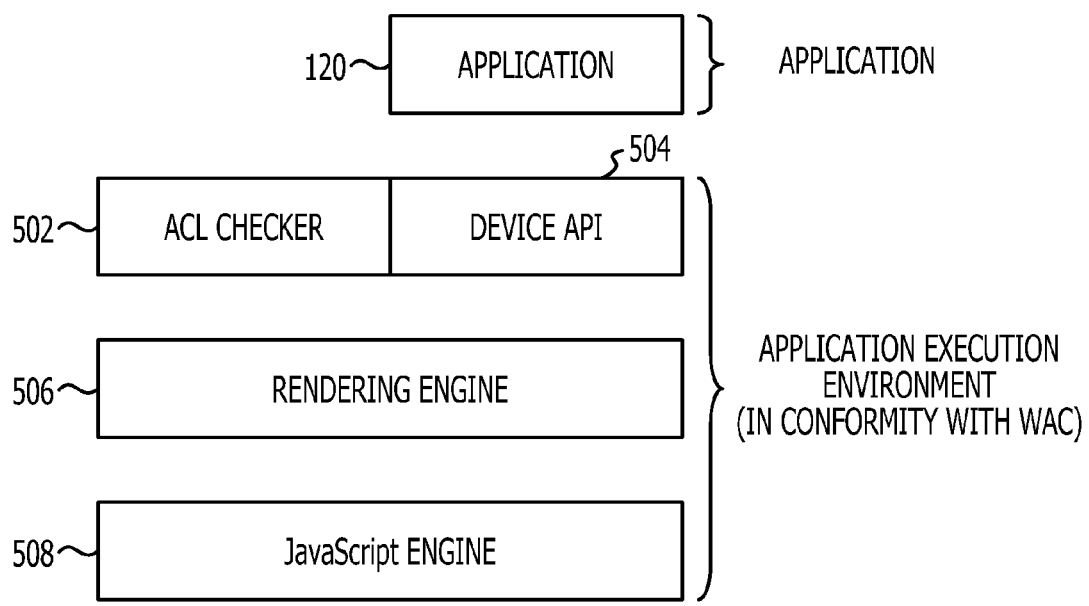
FIG. 10 depicts an execution environment of the client.

FIG. 10 depicts the relationship between the application execution environment in conformity with the WAC that the client 300 has and the application. The application execution environment is built in such a way that the CPU 301 executes, in the main memory 302, the engine stored in the flash memory 313 of the client 300. By executing the engine concerned in the main memory 302, the CPU 301 performs processing of a JavaScript engine 508, thereby running a program written in JavaScript. By executing the engine concerned in the main memory 302, the CPU 301 performs processing of a rendering engine 506, thereby displaying HTML, which is read by a browser or the like. In this embodiment, the CPU 301 uses the rendering engine 506, for example, as a module that acquires an event when network access or the like occurs. By executing the engine concerned in the main memory 302, the CPU 301 operates a device application program interface (API) 504 and causes the application 120 to access a device in conformity with WAC 2.0. Note that the application 120 is executed on a higher layer of the device API 504. By executing the engine concerned in the main memory 302, the CPU 301 performs processing of an ACL checker 502, thereby checking the ACL 230 at runtime.

Figure 11:
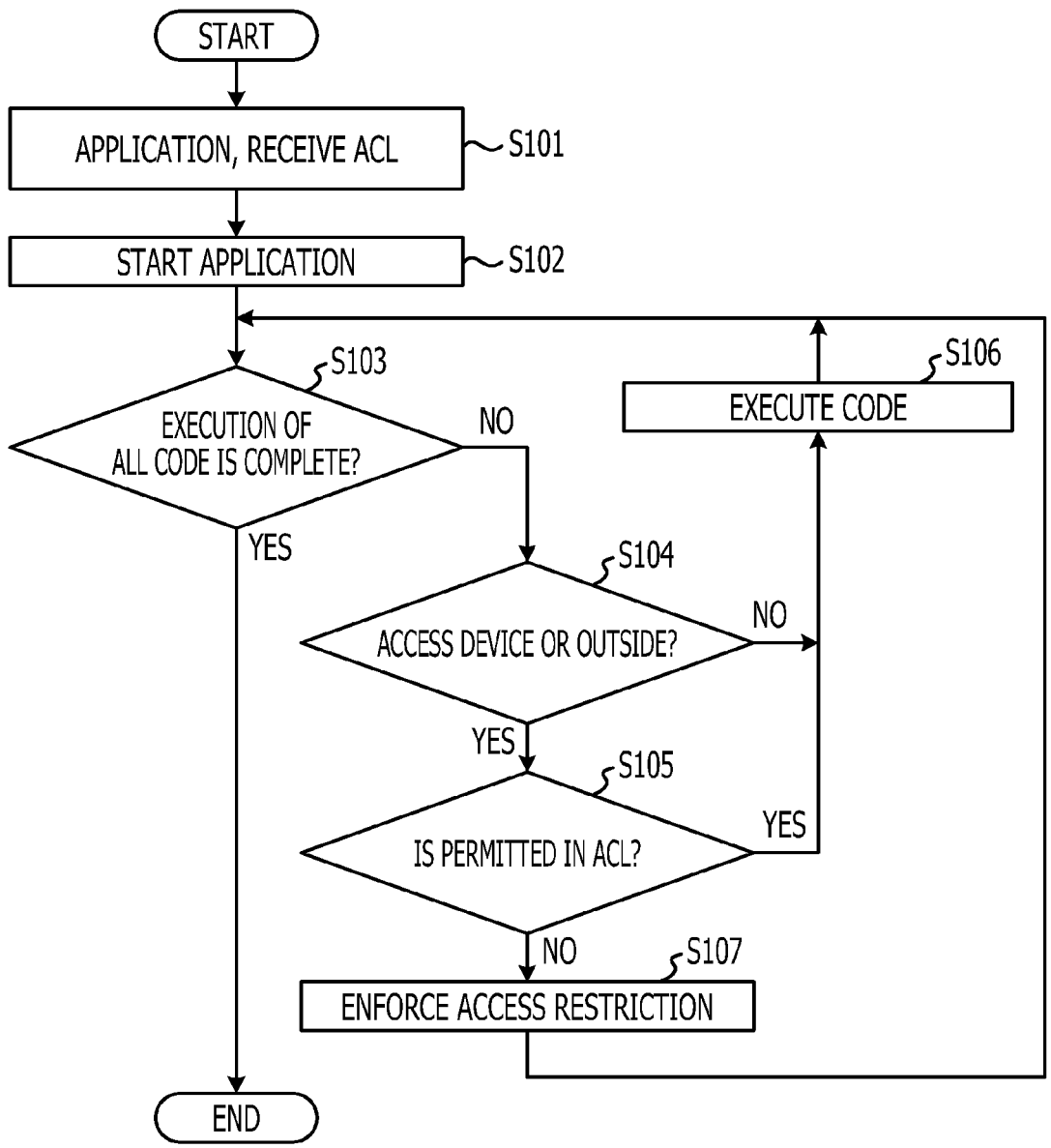
FIG. 11 is a flowchart depicting the client.

FIG. 11 depicts processing of the client 300.

In step S101, the downloading unit 320 receives the Web application 120 and the ACL 230 from the packager 200. The downloading unit 320 advances the process to step S102.

In step S102, the application determination unit 330 receives the Web application 120 from the downloading unit 320 and starts it. The application determination unit 330 advances the process to step S103.

In step S103, the application determination unit 330 determines whether all the code has been executed. If all the code has been executed, then the application determination unit 330 completes the process. On the other hand, if all the code has not been executed, then the application determination unit 330 advances the process to step S104.

In step S104, the application determination unit 330 determines whether code to be executed is access to a device or access to the outside. If the determination is affirmative, then the application determination unit 330 advances the process to step S105. On the other hand, if the determination is negative, then the application determination unit 330 advances the process to step S106.

In step S105, referring to the ACL 230, the application determination unit 330 determines whether the device or URL to be accessed is permitted. If the device or URL to be accessed is permitted, then the application determination unit 330 advances the process to step S106. On the other hand, if the device or URL to be accessed is not permitted, then the application determination unit 330 advances the process to step S107.

In step S106, the application determination unit 330 executes the code. The application determination unit 330 returns the process to step S103.

In step S107, the application determination unit 330 prohibits execution of a piece of code that is not permitted in order to enforce an access restriction. The application determination unit 330 returns the process to step S103, and repeats the above processing until execution of all the code is complete.

According to this embodiment, the source code of a Web application is executed sequentially from the top as usual. During execution, every time device access or network access entered in the ACL 230 occurs, the application determination unit 330 checks at runtime whether the device access or network access is permitted in the ACL 230. The application determination unit 330 allows execution of a piece of code that is permitted and prohibits execution of a piece of code that is not permitted. This inhibits unauthorized device access or network access while allowing the Web application to run normally. Thus, if there is published on the Web server an application into which malware has been incorporated through such a procedure that a Web application published on a Web server is acquired in a normal process, is inversely assembled, is mixed and assembled with malware, is repackaged, and is published, an access restriction is imposed on the application, and therefore personal information is inhibited from being extracted from a terminal and being sent freely to a malicious user's server, for example. With the Web application into which malware has been incorporated, a normal portion thereof is executed, and a malware portion is not executed.

According to the embodiment described above, there is provided an information processing system that allows an application to be executed without giving a user trouble and while maintaining security.

According to the embodiment described above, a piece of code that is permitted is executed and a piece of code that is not permitted is not executed, at the time of execution of an application. Consequently, unauthorized device access or network access is inhibited while the application is allowed to run normally. This increases security.

While an information processing system of an exemplary embodiment of the present disclosure has been described above, the embodiment is not intended to be limited to the embodiment specifically disclosed herein, and various modifications and changes may be made without departing from the scope of the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method of controlling an information processing system, the method comprising:
   generating, by a first apparatus, association information indicating permission of access to at least one of a specific access destination and a specific device, the access to be requested when a specific code among a plurality of codes of an application program is executed; and
   sending, by the first apparatus, the application program and the association information to a second apparatus configured to execute the application program;
   executing, by the second apparatus, the application program; and
   restricting, by the second apparatus, another access different from the access based the association information generated by the first apparatus when the another access is requested due to the execution of the plurality of codes of the application program.

2. A non-transitory computer-readable recording medium having stored therein a program for causing a relay apparatus to execute a digital signature process comprising:
   receiving an application program;
   analyzing whether a specific code being applicable to restriction defined in an analysis rule has been included in the application program, the analysis rule defining that the restriction is expected when the application program is executed;
   generating association information indicating permission of access to at least one of a specific access destination and a specific device, when it is determined that the specific code has been included in the application program at a time of the analyzing;
   sending the application program and the association information to a another apparatus configured to execute the application program; and
   sending the association information to determine whether another access, different from the access, is restricted when the another access is requested due to an execution of the plurality of codes of the application program.

3. A non-transitory computer-readable recording medium having stored therein a program for causing a client apparatus to execute a digital signature process comprising:
   receiving an application program with association information another apparatus, the association information being generated by the another apparatus and indicating permission of an access to at least one of a specific access destination and a specific device, the access to be requested when a specific code among a plurality of codes of the application program is executed;
   executing the application program; and
   restricting another access, different from the access based on association information, when the another access is requested due to the execution of the plurality of codes of the application program.

4. A system comprising:
a first apparatus; and
a second apparatus configured to:
   generate association information indicating permission of access to at least one of a specific access destination and a specific device, the access to be requested when a specific code among a plurality of codes of an application program is executed, and
   send the application program to the first apparatus with the association information,
wherein the first apparatus is configured to:
   execute the application program, and
   restrict another access, different from the access based on the association information, when the another access is requested due to the execution of the plurality of codes of the application program.

* * * * *

UNITED STATES PATENT AND TRADEMARK OFFICE
CERTIFICATE OF CORRECTION

| | | |
|---|---|---|
| PATENT NO. | : 8,904,492 B2 | Page 1 of 1 |
| APPLICATION NO. | : 13/566300 | |
| DATED | : December 2, 2014 | |
| INVENTOR(S) | : Yosuke Nakamura et al. | |

It is certified that error appears in the above-identified patent and that said Letters Patent is hereby corrected as shown below:

In the Claims

Column 7, line 46, in Claim 1, delete "based the" and insert -- based on the --, therefor.
Column 8, line 13, in Claim 2, delete "to a another" and insert -- to another --, therefor.

Signed and Sealed this
Fifth Day of May, 2015

Michelle K. Lee
*Director of the United States Patent and Trademark Office*